United States Patent
Braun et al.

(10) Patent No.: US 7,116,084 B2
(45) Date of Patent: Oct. 3, 2006

(54) STEP-UP CONVERTER HAVING POWER FACTOR CORRECTION

(75) Inventors: Alois Braun, Neuburg (DE); Walter Limmer, München (DE); Joachim Mühlschlegel, Gröbenzell (DE)

(73) Assignee: Patent-Treuhand-Gesellschaft fuer Elertrische Glubhlampen mbH, Munich (DE)

( * ) Notice: Subject to any disclaimer, the term of this patent is extended or adjusted under 35 U.S.C. 154(b) by 27 days.

(21) Appl. No.: 10/952,784

(22) Filed: Sep. 30, 2004

(65) Prior Publication Data

US 2005/0083022 A1 Apr. 21, 2005

(30) Foreign Application Priority Data

Oct. 16, 2003 (DE) ................................. 103 48 210

(51) Int. Cl.
*G05F 1/652* (2006.01)

(52) U.S. Cl. ...................................... 323/222; 315/225
(58) Field of Classification Search ................ 323/222, 323/282, 284, 351, 223; 315/290 R, 224, 315/225, 247, 283
See application file for complete search history.

(56) References Cited

U.S. PATENT DOCUMENTS

| | | | |
|---|---|---|---|
| 6,060,844 A | 5/2000 | Chen | |
| 6,600,271 B1 * | 7/2003 | Chen | .................... 315/224 |
| 6,690,144 B1 * | 2/2004 | DeNicholas et al. | ........ 323/222 |
| 6,693,411 B1 * | 2/2004 | Bub et al. | .................... 323/282 |

FOREIGN PATENT DOCUMENTS

WO 01/69984 9/2001

* cited by examiner

*Primary Examiner*—Gary L Laxton
(74) *Attorney, Agent, or Firm*—Carlo S. Bessone

(57) ABSTRACT

A step-up converter has a power factor correction, has an input for connection to a supply voltage, in particular a rectified AC voltage; an inductor, a diode and a storage capacitor, which are coupled in a series arrangement between the input and the output, in which the voltage that is dropped across the storage capacitor is provided at the output; a switch, which is coupled between a junction point between the inductor and the diode, on the one hand, and a reference potential, on the other hand; and a drive circuit for the switch which controls the times for which the switch remains closed and open; the drive circuit being designed to control the time for which the switch remains closed as a function of the freewheeling time of the inductor. A method for operating such a step-up converter is also disclosed.

6 Claims, 4 Drawing Sheets

| | UC1 rms | | 235V | | | | | | | |
|---|---|---|---|---|---|---|---|---|---|---|---|
| | UC2 mean | | 355V | | | | | | | |
| t | $|U_{C1}|$ | $I_L$ | $U_{C1} * I_L$ | $U_{C2}$ | $U_{C2} - U_{C1}$ | $dt_a$ | fs | $dt_e/(dt_e+dt_a)$ | $I_{Lrms}$ | $I_{Srms}$ |
| 0.0000 | 0.00 | 0.000 | 0.0 | 355.0 | 355.0 | 0.00E+00 | 276091 | 1.000 | 0.000 | 0.000 |
| 0.0004 | 41.65 | 0.060 | 2.5 | 348.6 | 306.9 | 4.92E-07 | 243098 | 0.881 | 0.070 | 0.061 |
| 0.0008 | 82.65 | 0.120 | 9.9 | 342.4 | 259.8 | 1.15E-06 | 209454 | 0.759 | 0.138 | 0.105 |
| 0.0012 | 122.34 | 0.177 | 21.7 | 337.0 | 214.7 | 2.06E-06 | 175861 | 0.637 | 0.205 | 0.130 |
| 0.0016 | 160.11 | 0.232 | 37.1 | 332.7 | 172.6 | 3.36E-06 | 143212 | 0.519 | 0.268 | 0.139 |
| 0.0020 | 195.34 | 0.283 | 55.3 | 329.7 | 134.4 | 5.26E-06 | 112525 | 0.408 | 0.327 | 0.133 |
| 0.0024 | 227.50 | 0.330 | 75.0 | 328.4 | 100.9 | 8.16E-06 | 84846 | 0.307 | 0.381 | 0.117 |
| 0.0028 | 256.07 | 0.371 | 95.0 | 328.9 | 72.8 | 1.27E-05 | 61114 | 0.221 | 0.428 | 0.095 |
| 0.0032 | 280.60 | 0.407 | 114.1 | 331.0 | 50.4 | 2.02E-05 | 42039 | 0.152 | 0.469 | 0.071 |
| 0.0036 | 300.71 | 0.436 | 131.0 | 334.7 | 34.0 | 3.21E-05 | 28020 | 0.101 | 0.503 | 0.051 |
| 0.0040 | 316.07 | 0.458 | 144.7 | 339.6 | 23.5 | 4.87E-05 | 19130 | 0.069 | 0.529 | 0.037 |
| 0.0044 | 326.45 | 0.473 | 154.4 | 345.4 | 19.0 | 6.23E-05 | 15174 | 0.055 | 0.546 | 0.030 |
| 0.0048 | 331.68 | 0.481 | 159.4 | 351.8 | 20.1 | 5.98E-05 | 15767 | 0.057 | 0.555 | 0.032 |
| 0.0052 | 331.68 | 0.481 | 159.4 | 358.2 | 26.5 | 4.53E-05 | 20435 | 0.074 | 0.555 | 0.041 |
| 0.0056 | 326.45 | 0.473 | 154.4 | 364.3 | 37.9 | 3.12E-05 | 28689 | 0.104 | 0.546 | 0.057 |
| 0.0060 | 316.07 | 0.458 | 144.7 | 369.8 | 53.7 | 2.13E-05 | 40082 | 0.145 | 0.529 | 0.077 |
| 0.0064 | 300.71 | 0.436 | 131.0 | 374.2 | 73.5 | 1.48E-05 | 54235 | 0.196 | 0.503 | 0.099 |
| 0.0068 | 280.60 | 0.407 | 114.1 | 377.5 | 96.9 | 1.05E-05 | 70851 | 0.257 | 0.469 | 0.120 |
| 0.0072 | 256.07 | 0.371 | 95.0 | 379.3 | 123.3 | 7.52E-06 | 89714 | 0.325 | 0.428 | 0.139 |
| 0.0076 | 227.50 | 0.330 | 75.0 | 379.7 | 152.2 | 5.41E-06 | 110672 | 0.401 | 0.381 | 0.153 |
| 0.0080 | 195.34 | 0.283 | 55.3 | 378.6 | 183.2 | 3.86E-06 | 133632 | 0.484 | 0.327 | 0.158 |
| 0.0084 | 160.11 | 0.232 | 37.1 | 376.0 | 215.9 | 2.69E-06 | 158531 | 0.574 | 0.268 | 0.154 |
| 0.0088 | 122.34 | 0.177 | 21.7 | 372.1 | 249.8 | 1.77E-06 | 185321 | 0.671 | 0.205 | 0.137 |
| 0.0092 | 82.65 | 0.120 | 9.9 | 387.1 | 284.5 | 1.05E-06 | 213937 | 0.775 | 0.138 | 0.107 |
| 0.0096 | 41.65 | 0.060 | 2.5 | 361.3 | 319.7 | 4.72E-07 | 244262 | 0.885 | 0.070 | 0.062 |
| 0.0100 | 0.00 | 0.000 | 0.0 | 355.0 | 355.0 | 6.44E-21 | 276091 | 1.000 | 0.000 | 0.000 |

Tab. 1

Tab. 2

| UC1 rms | 235V | | | | | | | | | |
| UC2 mean | 387V | | | | | | | | | |
| t | $|U_{C1}|$ | $I_L$ | $U_{C2}$ | $U_{C1} * I_L$ | $U_{C2} - U_{C1}$ | $dt_a$ | fs | $dt_e/(dt_e+dt_a)$ | $I_{Lrms}$ | $I_{Srms}$ |
|---|---|---|---|---|---|---|---|---|---|---|
| 0.0000 | 0.00 | 0.000 | 387.0 | 0.0 | 387.0 | 0.00E+00 | 276091 | 1.000 | 0.000 | 0.000 |
| 0.0004 | 41.65 | 0.060 | 381.1 | 2.5 | 339.5 | 4.44E-07 | 245915 | 0.891 | 0.070 | 0.062 |
| 0.0008 | 82.65 | 0.120 | 375.5 | 9.9 | 292.9 | 1.02E-06 | 215323 | 0.780 | 0.138 | 0.108 |
| 0.0012 | 122.34 | 0.177 | 370.6 | 21.7 | 248.2 | 1.79E-06 | 184938 | 0.670 | 0.205 | 0.137 |
| 0.0016 | 160.11 | 0.232 | 366.6 | 37.1 | 206.5 | 2.81E-06 | 155519 | 0.563 | 0.268 | 0.151 |
| 0.0020 | 195.34 | 0.283 | 364.0 | 55.3 | 168.6 | 4.20E-06 | 127908 | 0.463 | 0.327 | 0.151 |
| 0.0024 | 227.50 | 0.330 | 362.8 | 75.0 | 135.3 | 6.09E-06 | 102954 | 0.373 | 0.381 | 0.142 |
| 0.0028 | 256.07 | 0.371 | 363.2 | 95.0 | 107.1 | 8.66E-06 | 81423 | 0.295 | 0.428 | 0.126 |
| 0.0032 | 280.60 | 0.407 | 365.1 | 114.1 | 84.5 | 1.20E-05 | 63905 | 0.231 | 0.469 | 0.109 |
| 0.0036 | 300.71 | 0.436 | 368.4 | 131.0 | 67.7 | 1.61E-05 | 50756 | 0.184 | 0.503 | 0.092 |
| 0.0040 | 316.07 | 0.458 | 372.9 | 144.7 | 56.9 | 2.01E-05 | 42091 | 0.152 | 0.529 | 0.081 |
| 0.0044 | 326.45 | 0.473 | 378.2 | 154.4 | 51.8 | 2.28E-05 | 37806 | 0.137 | 0.546 | 0.075 |
| 0.0048 | 331.68 | 0.481 | 384.0 | 159.4 | 52.4 | 2.29E-05 | 37641 | 0.136 | 0.555 | 0.076 |
| 0.0052 | 331.68 | 0.481 | 389.9 | 159.4 | 58.3 | 2.06E-05 | 41244 | 0.149 | 0.555 | 0.083 |
| 0.0056 | 326.45 | 0.473 | 395.6 | 154.4 | 69.1 | 1.71E-05 | 48233 | 0.175 | 0.546 | 0.095 |
| 0.0060 | 316.07 | 0.458 | 400.6 | 144.7 | 84.5 | 1.35E-05 | 58242 | 0.211 | 0.529 | 0.112 |
| 0.0064 | 300.71 | 0.436 | 404.7 | 131.0 | 104.0 | 1.05E-05 | 70945 | 0.257 | 0.503 | 0.129 |
| 0.0068 | 280.60 | 0.407 | 407.7 | 114.1 | 127.1 | 8.00E-06 | 86074 | 0.312 | 0.469 | 0.146 |
| 0.0072 | 256.07 | 0.371 | 409.4 | 95.0 | 153.4 | 6.05E-06 | 103416 | 0.375 | 0.428 | 0.160 |
| 0.0076 | 227.50 | 0.330 | 409.8 | 75.0 | 182.3 | 4.52E-06 | 122812 | 0.445 | 0.381 | 0.169 |
| 0.0080 | 195.34 | 0.283 | 408.7 | 55.3 | 213.4 | 3.32E-06 | 144142 | 0.522 | 0.327 | 0.171 |
| 0.0084 | 160.11 | 0.232 | 406.4 | 37.1 | 246.3 | 2.35E-06 | 167311 | 0.606 | 0.268 | 0.162 |
| 0.0088 | 122.34 | 0.177 | 402.8 | 21.7 | 280.4 | 1.58E-06 | 192227 | 0.696 | 0.205 | 0.143 |
| 0.0092 | 82.65 | 0.120 | 398.2 | 9.9 | 315.5 | 9.49E-07 | 218780 | 0.792 | 0.138 | 0.110 |
| 0.0096 | 41.65 | 0.060 | 392.8 | 2.5 | 351.1 | 4.30E-07 | 246814 | 0.894 | 0.070 | 0.062 |
| 0.0100 | 0.00 | 0.000 | 387.0 | 0.0 | 387.0 | 5.91E-21 | 276091 | 1.000 | 0.000 | 0.000 |

STEP-UP CONVERTER HAVING POWER FACTOR CORRECTION

FIELD OF THE INVENTION

The present invention relates to a step-up converter having power factor correction, having an input for connection to a supply voltage, in particular a rectified AC voltage, an inductor, a diode and a storage capacitor, which are coupled in a series arrangement between the input and an output, in which the voltage that is dropped across the storage capacitor is provided at the output, a switch, which is coupled between a junction point between the inductor and the diode, on the one hand, and a reference potential, on the other hand, and a drive circuit for the switch which controls the times for which the switch remains closed and open. Moreover, it relates to a method for operating such a step-up converter and an electronic ballast for driving at least one electric lamp having such a step-up converter.

FIG. 1 shows such a step-up converter, whose basic structure without the current measuring device is known, as is explained in more detail below. On the input side, a voltage $U_{C1}$ is dropped across a capacitor C1. The output voltage $U_{C2}$ is provided at the output by a capacitor C2. The voltage that is dropped across the switch is $U_S$, and the voltage that is dropped across the diode is $U_D$. The current through the inductor is $I_L$, the drive circuit has the reference numeral 10 and a current measuring device for measuring the current through the diode D has the reference numeral 12.

For the purpose of better understanding, the problem on which the invention is based is explained using the example of driving lamps. However, as is obvious to those skilled in the art, the step-up converter according to the invention may easily be used in other technical areas.

Two premises need to be adhered to when designing this circuit structure: Firstly, the voltage $U_{C2}$ at any point in time t must be greater than the voltage $U_{C1}$ in order for the power factor correction to function. Secondly, in order to keep the power loss low for the entire circuit arrangement including the circuit downstream, and thus also to keep low the demands which are placed on the components involved, the voltage $U_{C2}$ provided needs to be as small as possible.

BACKGROUND OF THE INVENTION

In the prior art, only $U_{C2}$ was measured, and, in relation to this, the time $dt_e$ for which the switch remains closed was regulated. When designing the circuit, however, a worst-case design must be carried out which takes into account different causes of fluctuations in $U_{C1}$. Firstly, $U_{C1}$ may change when the rated voltage changes when crossing over national boundaries, and may also have tolerances of up to plus/minus 15 percent at a given rated voltage. If, for example, the rated voltage $U_{C1}$ is assumed to be 240 V, this voltage at the system peak may be 276 V multiplied by the square root of 2, that is approximately 390 V. A design for $U_{C2}$ for this operation would therefore be approximately 425 V. At a different rated voltage of 230 V and without any tolerances, $U_{C1}$ at the system peak would be equal to 230 V multiplied by the square root of 2=325 V and an optimum design for $U_{C2}$ for this rated operation would therefore be approximately 355 V. As already mentioned, however, in a design without regulation the worst case would have to be assumed here for $U_{C1}$. Since, furthermore, the tolerance of the measurement of $U_{C2}$ and the ripple voltage of $U_{C2}$ need to be taken into account, as a result in normal operation over 70 V are given away, as it were.

Another solution is to measure $U_{C1}$ and $U_{C2}$ and to regulate the time $dt_e$ for which the switch S remains closed such that the difference between the two voltages is kept to a minimum. Since, however, the two voltages are measured at the reference potential, where the difference needs to be very small, the tolerances of the voltage measurements need to be taken into account. In the event of small differences, this results in a multiplication of the tolerance of the difference. This solution therefore does not provide an optimum circuit design, either, and therefore still results in undesirably high power loss and its inherent consequences.

In relation to the prior art, reference is also made to WO 01/69984 A2.

SUMMARY OF THE INVENTION

The object of the present invention is therefore to develop the step-up converter mentioned initially and the method mentioned initially such that the power loss converted in the circuit arrangement is minimized.

The present invention is based on the knowledge that the power loss can be further reduced when the drive circuit for the switch is designed to control the time for which the switch remains closed as a function of the freewheeling time of the inductor. This results in a simple and very accurate way of measuring the voltage difference between $U_{C2}$ and $U_{C1}$ without tolerance problems. The measurement accuracies for this voltage difference which are known from the prior art are dispensed with, and said voltage difference can thus be minimized easily and reliably.

The abovementioned knowledge is of equal importance for regulating the step-up converter to ensure a maximum freewheeling time $dt_a$ during a period of the supply voltage $U_{C1}$ which occurs at a point in time close to the peak. This brings about a large number of advantages: Firstly, the wattless power which is to be dealt with in the step-up converter is reduced. The operating frequency and with it the switching losses in the step-up converter are likewise reduced, as is the closing duty cycle of the switch S. When implementing the switch S as a transistor, its rms current and its ON losses are thus reduced. Since, for the purpose of measuring the difference between $U_{C2}$ and $U_{C1}$, the tolerances of the prior art no longer need to be taken into account, a smaller voltage $U_{C2}$ can be used. When driving lamps, it is thus of equal importance that the so-called intermediate circuit voltage can be reduced. Furthermore, advantages result in terms of radio interference suppression, since the resulting frequency components in the output signal, owing to the reduced switching frequency of the switch, slip into lower frequency ranges, where higher amplitude values are permitted by the corresponding standards. The lower frequency of the current through the inductor L makes a cost-effective design for this component possible. As a result of the lower current through the switching transistor in the switch S, the latter may also be implemented in a more favorable manner. Furthermore, in the lamp sector the power loss of the downstream converters, for example the buck converter in high-pressure discharge lamps, and the half-bridge in low-pressure lamps, is reduced. In addition, a device having a universal system input $U_{C1}$ (100 to 277 V) can be implemented more easily.

In one preferred embodiment, the drive circuit also comprises a device for determining the point in time at which the current through the inductor has reached the value zero. The result of the detection as to when the current through the inductor is equal to zero can be tapped off effectively and with low tolerances. A practically self-financing implementation is made possible by the corresponding PWM (pulse width modulation) for measuring the freewheeling time being used in the digitally controlled switch. Instead of the detection of the current zero crossing, an evaluation may also be carried out to determine when the change in current over time passes from positive to negative. The evaluation of voltage correlated with the current is of course also possible. As a function of said digital implementation, embodiments are also advantageous, however, which provide, in a conventional, analogous manner, for the regulation of the time for which the switch remains closed to ensure a maximum freewheeling time. The advantages mentioned still apply in this case.

Further advantageous embodiments are described in the subclaims.

BRIEF DESCRIPTION OF THE TABLES AND DRAWINGS

An exemplary embodiment of the invention will now be described in more detail below with reference to the attached drawings and tables, in which.

Figure 4:
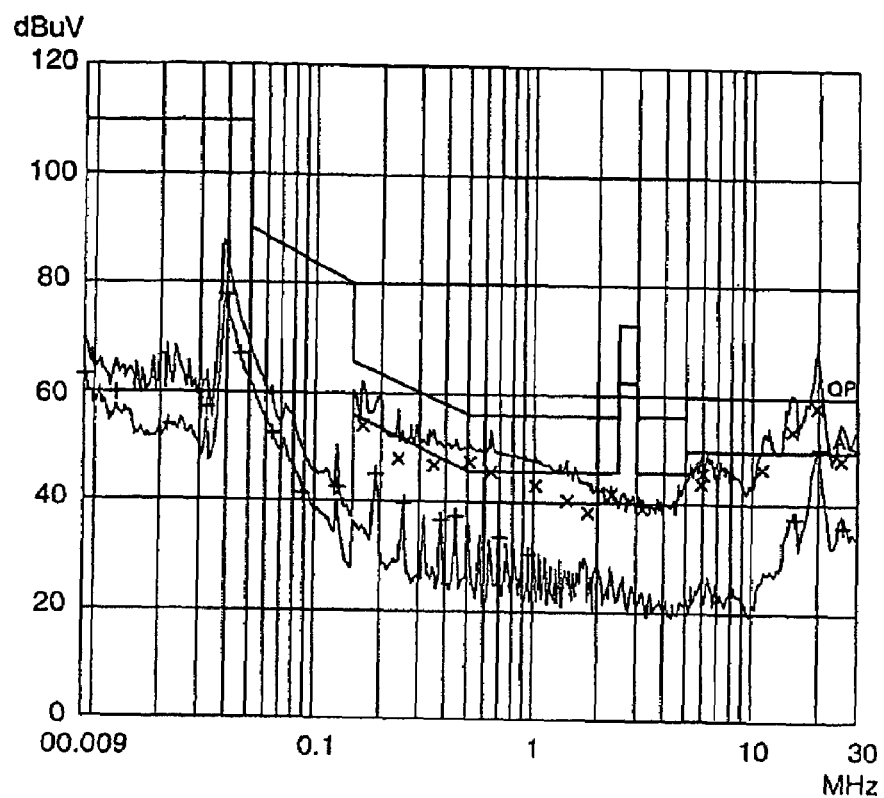
Figure 5:
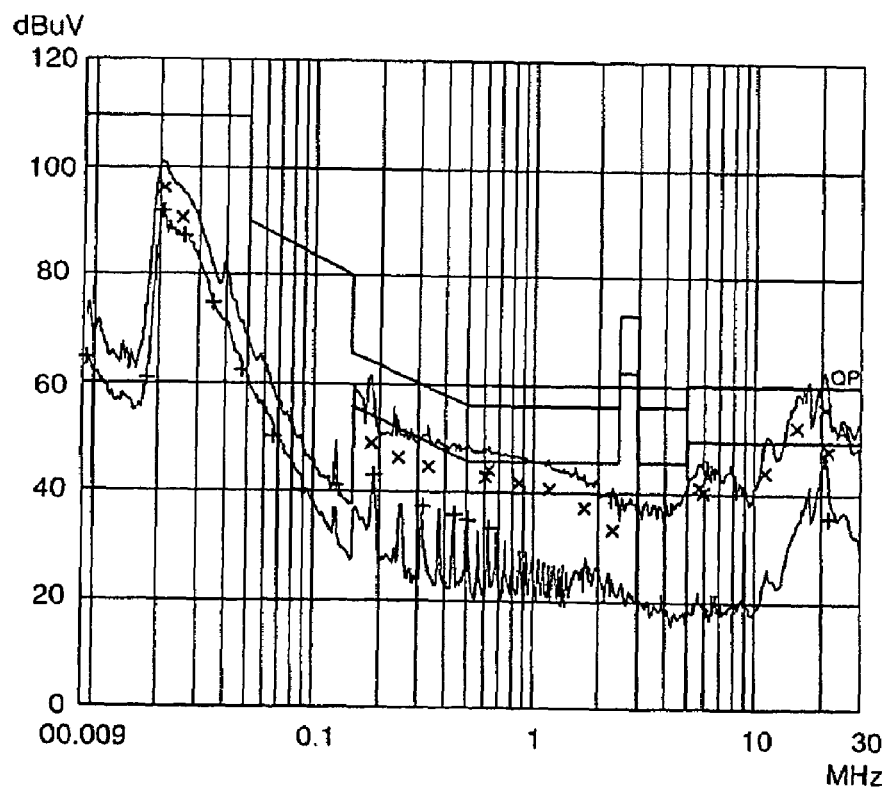

FIG. 4 shows the spectrum of the radio interference values according to a conventionally dimensioned radio interference filter based on EN55015 without the use of a step-up converter according to the invention, i.e. with a design according to the prior art and with $U_{C2}$ being set at 387 V; and FIG. 5 shows the spectrum of the radio interference values according to a radio interference filter, dimensioned as in FIG. 4, based on EN55015 in a circuit arrangement having a step-up converter according to the invention and with $U_{C2}$ being set at 350 V.

Tab. 1 shows, in table form, the time characteristic of different variables of an exemplary implementation of a circuit at a mean voltage $U_{C2}$ of 355 V; and Tab. 2 shows, in table form, the time characteristic of different variables of an exemplary implementation of a circuit at a mean voltage $U_{C2}$ of 387 V.

DETAILED DESCRIPTION OF THE INVENTION

Figure 1:
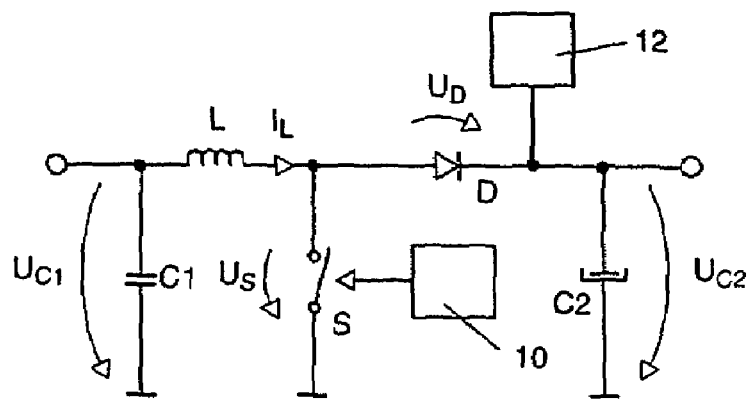
FIG. 1 shows a schematic illustration of an outline circuit diagram of a step-up converter according to the invention.
Figure 2:
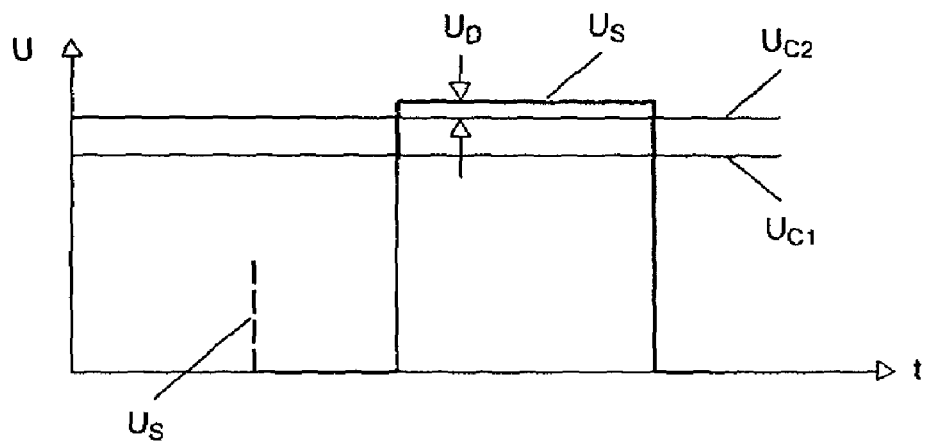
FIG. 2 shows a schematic illustration of the time characteristic of different voltages of the circuit arrangement of FIG. 1.
Figure 3:
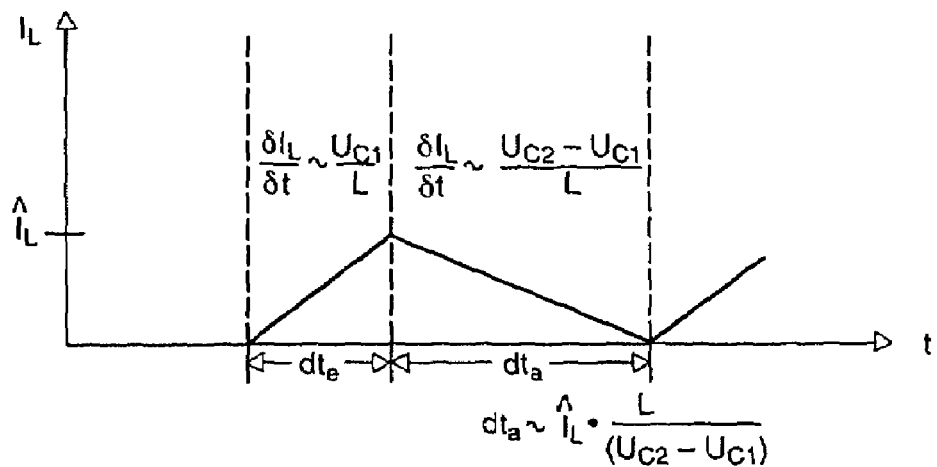
FIG. 3 shows a schematic illustration of the time characteristic of the current through the inductor of the circuit arrangement of FIG. 1.

FIG. 1 shows a step-up converter according to the invention, the drive circuit 10 being designed so as to control the time $dt_e$ for which the switch S remains closed as a function of the freewheeling time of the inductor L. A current measuring device 12 is used to establish the point in time at which the current $I_L$ is equal to zero. The current measuring device may be a parasitic resonant circuit. By looking at FIGS. 2 and 3 together it can be seen that, initially, during a time period $dt_e$, the switch S is closed in FIG. 1, and the voltage $U_S$ that is dropped across the switch therefore approaches zero. During this time, the change over time in the current is $$\frac{\partial I_L}{\partial t} \sim \frac{U_{C1}}{L}.$$

If the switch is opened, $U_S = U_D + U_{C2}$. It can also be seen in FIG. 2 that $U_{C2}$ is always greater than $U_{C1}$. During the time period $dt_a$, when the switch S is open, $$\frac{\partial I_L}{\partial t} \sim \frac{U_{C2} - U_{C1}}{L}.$$

By transposing this, a value can thus be given for $dt_a$, i.e. the time for which the switch S remains open, by $$dt_a \sim \hat{I}_L \cdot \frac{L}{(U_{C2} - U_{C1})}.$$

Since sufficiently accurate values for $\hat{I}_L$ and the inductor L are known, it is possible directly to determine from this, by establishing the freewheeling time (i.e. $I_L = 0$), the voltage difference $U_{C2} - U_{C1}$, without subtracting two measured variables which are subject to tolerances.

It may be seen from the last equation that minimizing the voltage difference $U_{C2} - U_{C1}$ results in very long times $dt_a$ for which the switch is open. In practice, however, care must be taken to ensure that the extension of the freewheeling time does not result in switching frequencies which are so low that they are in the audible range. In practice, in the field of application discussed by way of example, the lamp sector, the switching frequencies will therefore be approximately 20 to 50 kHz. With regard to switching losses, a practical upper limit for the switching frequency is at approximately 200 kHz. The regulation of the time $dt_e$ for which the switch remains closed in the drive circuit 10 is preferably designed to have a time constant of 50 to 500 ms, preferably 100 ms.

Table 1 shows, in table form, the time characteristic of different variables for a step-up converter according to the invention which is designed to have a mean voltage $U_{C2}$ of 355 V. In contrast to this, table 2 shows the time characteristic of the same variables for a step-up converter according to the invention which is designed to have a mean voltage $U_{C2}$ of 387 V. A few special features are referred to in detail below: in table 1, the difference between $U_{C2}$ and $U_{C1}$ is reduced in step n=11 to 19 V. The time $dt_a$ for which the switch remains open is in this range at a maximum of 6.23E-05s. Owing to the slow change in the time $dt_e$ for which the switch remains closed, in the representation in table 1 and table 2, this time may be seen almost as constant. Correspondingly, the duty cycle $$\frac{dt_e}{dt_e + dt_a}$$

in the step n=11 in table 1 is at a minimum, to be precise 0.055. The switching frequency fs is likewise at a minimum in the step n=11 and is approximately 15 kHz. The maximum occurring voltage $U_{C2}$ is 379.7 V.

In table 2, the minimum difference $U_{C2}-U_{C1}$ is 51.8 V when the maximum time $dt_a$ for which the switch remains open is equal to 2.29E -05s corresponding to a switching frequency fs equal to 37.6 kHz. The maximum voltage $U_{C2}$ is 409.8 V. The ON losses and switching losses according to the data in table 1 are, based on the data in table 2, 65 percent and 76 percent, respectively.

Finally, FIGS. 4 and 5 show the radio interference values of the circuit arrangement according to a conventionally dimensioned radio interference filter based on EN55015, FIG. 4 without the use of a step-up converter according to the invention and with $U_{C2}$ being set at an average value of 387 V, and FIG. 5 with the use of a step-up converter according to the invention and with $U_{C2}$ being set at an average value of 350 V. Of the lines shown in the form of sections of a straight line, in each case the upper line refers to the definitive standard for peak measurements, and the respective lower line refers to the definitive line for average measurements. Of the measured lines, the respective upper measured line refers to a peak measurement, and the lower line to an average measurement. It can clearly be seen that, in FIG. 5, the spectrum is shifted, compared with the spectrum of FIG. 4, to lower frequencies, i.e. precisely where the standard offers a lot of freedom since the measured spectral components are higher there. When the standard is critical, the spectral components fall into noncritical regions. This means that there are few problems as regards adherence to specifications for radio interference.

The invention claimed is:

1. A step-up converter having power factor correction, having
    an input for connection to a supply voltage ($U_{C1}$);
    an inductor (L) having a freewheeling time ($dt_a$), a diode (D) and a storage capacitor (C2) coupled in a series arrangement between the input and an output, in which a voltage ($U_{C2}$) dropped across the storage capacitor (C2) is provided at the output;
    a switch (S) coupled between a junction point between the inductor (L) and the diode (D), and a reference potential; and
    a drive circuit (10) for the switch (S) which controls times ($dt_e$; $dt_a$) for which the switch (S) remains closed and open;
    characterized, in that the drive circuit (10) controls a time ($dt_e$) for which the switch (S) remains closed as a function of the freewheeling time ($dt_a$) of the inductor (L).

2. The step-up converter as claimed in claim 1, characterized in that the drive circuit (10) also has a device (12) for determining a point in time at which a current ($I_L$) through the inductor (L) has reached zero.

3. The step-up converter as claimed in claim 1, characterized in that the drive circuit (10) is designed to regulate the time ($dt_e$) for which the switch (S) remains closed to ensure a maximum freewheeling time ($dt_a$).

4. A method for operating a step-up converter having power factor correction, which has an input for connection to a supply voltage ($U_{C1}$), an inductor (L), a diode (D) and a storage capacitor (C2) coupled in a series arrangement between the input and an output, in which a voltage ($U_{C2}$) dropped across the storage capacitor (C2) is provided at the output, and a switch (S), which is coupled between a junction point between the inductor (L) and the diode (D) and a reference potential, said method comprising the following steps:
    a) determining a freewheeling time ($dt_a$) of the inductor (L); and
    b) controlling a time ($dt_e$) for which the switch (S) remains closed as a function of the freewheeling time ($dt_a$).

5. The step-up converter as claimed in claim 2, characterized in that the drive circuit (10) is designed to regulate the time ($dt_e$) for which the switch (S) remains closed to ensure a maximum freewheeling time ($dt_a$).

6. An electronic ballast for driving at least one electric lamp, said electronic ballast including a step-up converter having
    an input for connection to a supply voltage ($U_{C1}$);
    an inductor (L) a freewheeling time ($dt_a$), a diode (D) and a storage capacitor (C2) coupled in a series arrangement between the input and an output, in which a voltage ($U_{C2}$) dropped across the storage capacitor (C2) is provided at the output;
    a switch (S) coupled between a junction point between the inductor (L) and the diode (D), and a reference potential; and
    a drive circuit (10) for the switch (S) for controlling times ($dt_e$; $dt_a$) for which the switch (S) remains closed and open, the drive circuit (10) controls a time ($dt_e$) for which the switch (S) remains closed as a function of the freewheeling time ($dt_a$) of the inductor (L).

* * * * *